(12) United States Patent
Nonaka et al.

(10) Patent No.: US 7,509,029 B2
(45) Date of Patent: Mar. 24, 2009

(54) APPARATUS FOR RECORDING AND REPRODUCING PLURAL STREAMS COMPRESSED IN DIFFERENT FORMATS

(75) Inventors: Tomoyuki Nonaka, Fujisawa (JP); Manabu Sasamoto, Yokohama (JP); Satoshi Iimuro, Yokohama (JP); Satoru Takashimizu, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 618 days.

(21) Appl. No.: 11/063,736

(22) Filed: Feb. 24, 2005

(65) Prior Publication Data

US 2006/0029373 A1 Feb. 9, 2006

(30) Foreign Application Priority Data

Aug. 4, 2004 (JP) ............................. 2004-227416

(51) Int. Cl.
*H04N 5/765* (2006.01)
(52) U.S. Cl. ................... 386/124; 386/125; 386/E5.002
(58) Field of Classification Search ................ 386/124, 386/46, 95, 131, E5.002
See application file for complete search history.

(56) References Cited

U.S. PATENT DOCUMENTS

2002/0126986 A1* 9/2002 Lim et al. .................... 386/52
2005/0058434 A1* 3/2005 Nakashika et al. ............ 386/95

FOREIGN PATENT DOCUMENTS

JP 2002-334561 11/2002

* cited by examiner

*Primary Examiner*—David E Harvey
(74) *Attorney, Agent, or Firm*—McDermott Will & Emery LLP

(57) ABSTRACT

A recording and reproducing apparatus capable of recording and reproducing the signals of both a digital broadcast system and an analog broadcast system is disclosed. By utilizing the existing configuration efficiently, the cost increase due to the system change is minimized. Both the digital broadcast system and the analog broadcast system are connected to a connector to receive both digital and analog broadcast signals. The analog broadcast signal input through the connector is recorded in a digital broadcast signal recording unit of the digital broadcast system under the control of the control unit included in the digital broadcast system.

2 Claims, 13 Drawing Sheets

FIG. 3

| | 405 | 427 | 426 | 425 | 424 | 423 | 422 | 421 | 420 |
|---|---|---|---|---|---|---|---|---|---|
| | REGISTER | 7 | 6 | 5 | 4 | 3 | 2 | 1 | 0 |
| 406 | Featuers | na | na | na | na | na | na | OVL | DMA |
| 407 | Sector Count | TAG | | | | | na | na | Na |
| 408 | Sector Number | Na | | | | | | | |
| 409 | Cylinder Low | Byte Count Limit [ 7 : 0 ] | | | | | | | |
| 410 | Cylinder High | Byte Count Limit [ 15 : 8 ] | | | | | | | |
| 411 | Device / Head | obs | na | obs | DEV | na | na | na | na |
| 412 | Command | Aoh | | | | | | | |

FIG. 5

| | 500 | 520 |
|---|---|---|
| | BYTES | CONTENTS |
| 501 | 0 | INSTRUCTION CODE |
| 502 | 1 | PARAMETER 0 |
| 503 | 2 | PARAMETER 1 |
| 504 | 3 | PARAMETER 2 |
| 505 | 4 | PARAMETER 3 |
| 506 | 5 | PARAMETER 4 |
| 507 | 6 | PARAMETER 5 |
| 508 | 7 | PARAMETER 6 |
| 509 | 8 | PARAMETER 7 |
| 510 | 9 | PARAMETER 8 |
| 511 | 10 | PARAMETER 9 |
| 512 | 11 | PARAMETER 10 |

APPARATUS FOR RECORDING AND REPRODUCING PLURAL STREAMS COMPRESSED IN DIFFERENT FORMATS

INCORPORATION BY REFERENCE

The present application claims priority from Japanese application JP2004-227416 filed on Aug. 4, 2004, the content of which is hereby incorporated by reference into this application.

BACKGROUND OF THE INVENTION

The present invention relates to a recording and reproducing apparatus for recording and reproducing a digital signal and an analog signal into and from a recording medium, or in particular to an apparatus for recording and reproducing a plurality of streams compressed in different formats in the same recording medium.

With the extension of the satellite digital broadcast and the launching of the terrestrial digital broadcast, the digitization of the broadcast signal has been promoted. The recording and reproducing apparatuses commercially available for digital broadcast include a unit recorder using a recording medium such as a hard disk drive (hereinafter referred to as the HDD), a DVD-RAM (digital versatile disk random access memory), a DVD-RW (digital versatile disk rewritable) or a Blu-layDis, or what is called a hybrid recorder as an integration of the aforementioned devices. The stream used for the digital broadcast and the transmission system according to IEEE-1394 is supplied in the form of an elementary stream including a video/audio stream encoded by MPEG2 (moving picture experts group), which stream is fetched into a PES (packetized elementary stream) packet for each common time base and supplied as a transport stream (hereinafter referred to as TS) including a plurality of PES packets coupled to each other. The stream recorded in the DVD, on the other hand, involves the MPEG2-PS (program stream) encoded by the MPEG2 method employed for the DVD-Video. The hybrid recorder may be used, for example, to copy or move the contents recorded temporarily in HDD to a removable DVD. The speed of the copy operation and movement have been increased. This conventional technique is disclosed in JP-A-2002-334561 (Patent Document 1).

SUMMARY OF THE INVENTION

Patent Document 1 discloses the invention in which the streams of different formats of MPEG2-TS and MPEG2-PS are converted into a storage format independent of the platform by a converter, so that the format difference between devices is absorbed and the same recording medium can be used while increasing the speed of the copy operation between the devices without real time.

In the above Patent Document 1, however, in the case where a combo recorder is configured utilizing the resources of a recording and reproducing apparatus of the digital broadcast system handling the existing MPEG2-TS and a recording and reproducing apparatus handling MPEG2-PS, an exclusive interface and converter are required to copy or move the contents between the recording and reproducing apparatus of MPEG2-TS type and the recording and reproducing apparatus of MPEG2-PS type. Adaptation to the existing recording and reproducing apparatus, however, increases the cost or the labor due to the system change.

In the recording and reproducing apparatus of MPEG2-TS or MPEG2-PS type, an interface is often connectable with two or more recording media. Therefore, a recording and reproducing apparatus is desirably implemented using an interface with recording media requiring a small system change.

Accordingly, this invention is concentrated on the reduction in labor and cost in a system change by utilizing the existing configuration of the recording and reproducing apparatus of the digital broadcast system.

According to this invention, there is provided a recording and reproducing apparatus comprising an analog broadcast unit to receive and reproduce an analog broadcast signal and a digital broadcast unit to receive and reproduce a digital broadcast signal, wherein the digital broadcast unit includes a digital recording unit to record the digital recording signal received, an input unit to input a control signal to control the recording operation into the digital recording unit and an analog broadcast signal received by the analog broadcast unit, and a control unit for controlling the recording operation into the digital recording unit, and wherein the control unit performs the control operation in such a manner that the analog broadcast signal input through the input unit is recorded into the digital recording unit based on the control signal input by the input unit.

According to this invention, the labor and cost of system change can be reduced by utilizing the configuration of the recording and reproducing apparatus of the existing digital broadcast system.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing parameters and a command of an ATA interface.

FIG. 5 is a diagram showing an ATAPI command.

DESCRIPTION OF THE EMBODIMENTS

Figure 14:
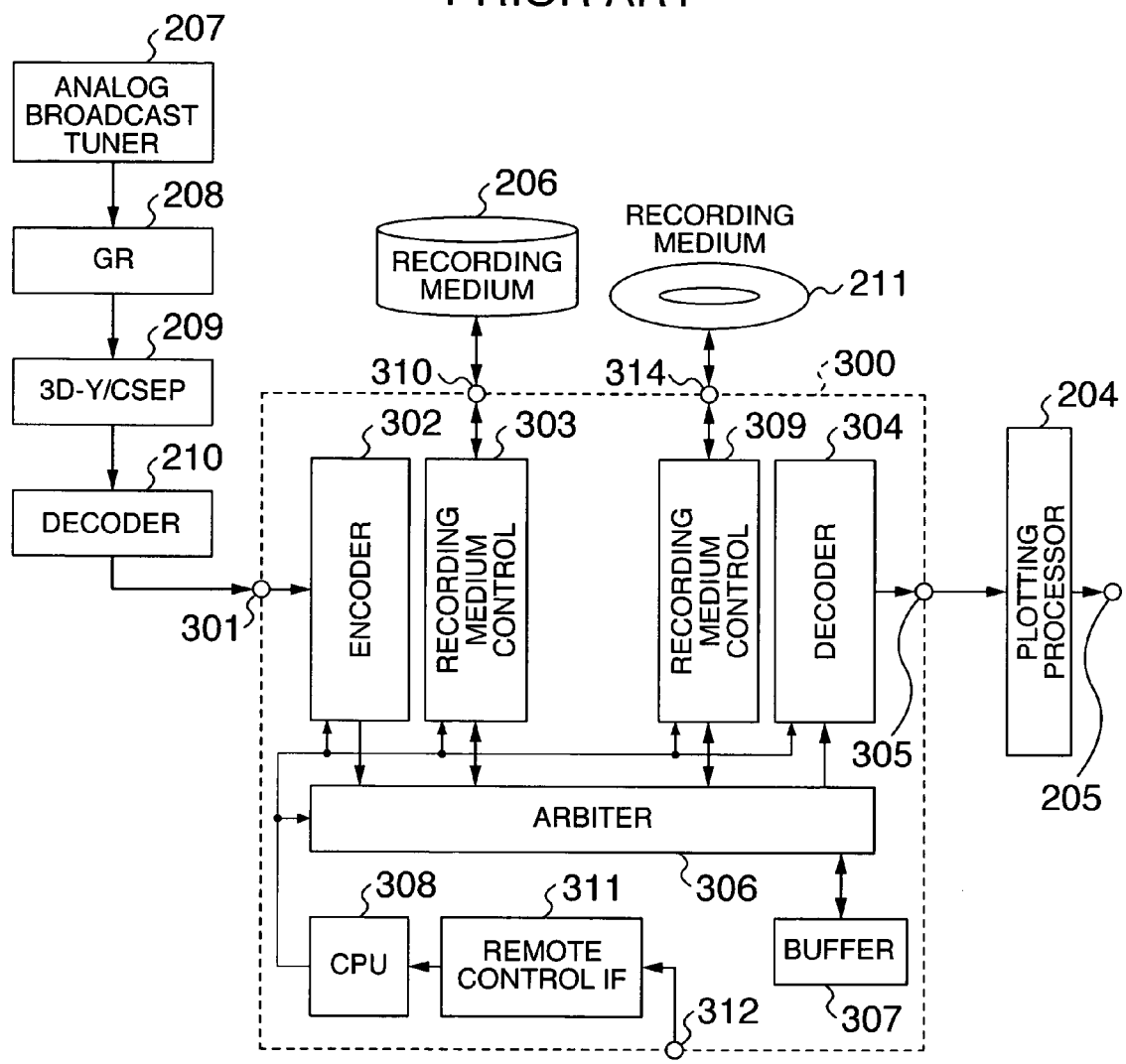
FIG. 14 is a diagram showing a block configuration of the conventional recording and reproducing apparatus.

An embodiment of the invention is described below with reference to the drawings. First, the conventional recording and reproducing apparatus for recording the analog broadcast signal in a recording medium is shown in FIG. 14. The analog broadcast signal received is recorded in a HDD or DVD and connected to view on a plasma display or a liquid crystal display. This conventional apparatus is configured of an analog tuner 207 for extracting, for example, a NTSC (National Television System Committee) video signal, a ghost removing unit 208 for digitizing the received video signal and removing the ghost generated by reflection or the like during transmission, a brightness/color signal separator 209 for separating the brightness signal and the color signal from each other utilizing the frame correlation of the video signal and removing noises, a NTSC decoder 210 for decoding the video signal, separated into the brightness and color signals, to a baseband video signal, for example, a recording and reproducing unit 300 for recording and reproducing the video signal in and from a first recording medium 206 and a second recording medium 211, a plotting processor 204 for plotting the signal reproduced from the recording media as a single screen or multiple screens, and an output terminal 205 from which the video signal is output to the display. The recording and reproducing unit 300 includes an input terminal 301, an encoder 302 for compressing and encoding the baseband video signal supplied in real time from the NTSC decoder 210 into a digital signal with high efficiency using, for example, MPEG2, recording medium control units 303, 309 for recording and reproducing the digital signal on the recording media, and connectors 310, 314 such as ATA (AT attachment) or ATAPI (ATA packet interface) for connecting the recording media such as a hard disk 310 and a DVD-RAM 314. Numeral 306 designates an arbiter, and numeral 307 a buffer. The digital signals from clients are supplied from the arbiter 306 and stored by time division in the buffer 307. Numeral 304 designates a decoder to decode the MPEG2-PS signal from the encoder 302 or the MPEG2-PS signal recorded in the recording media 206, 211. Numeral 308 designates a control circuit such as a microprocessor, numeral 312 a photodetector and numeral 311 a remote control I/F.

Figure 1:
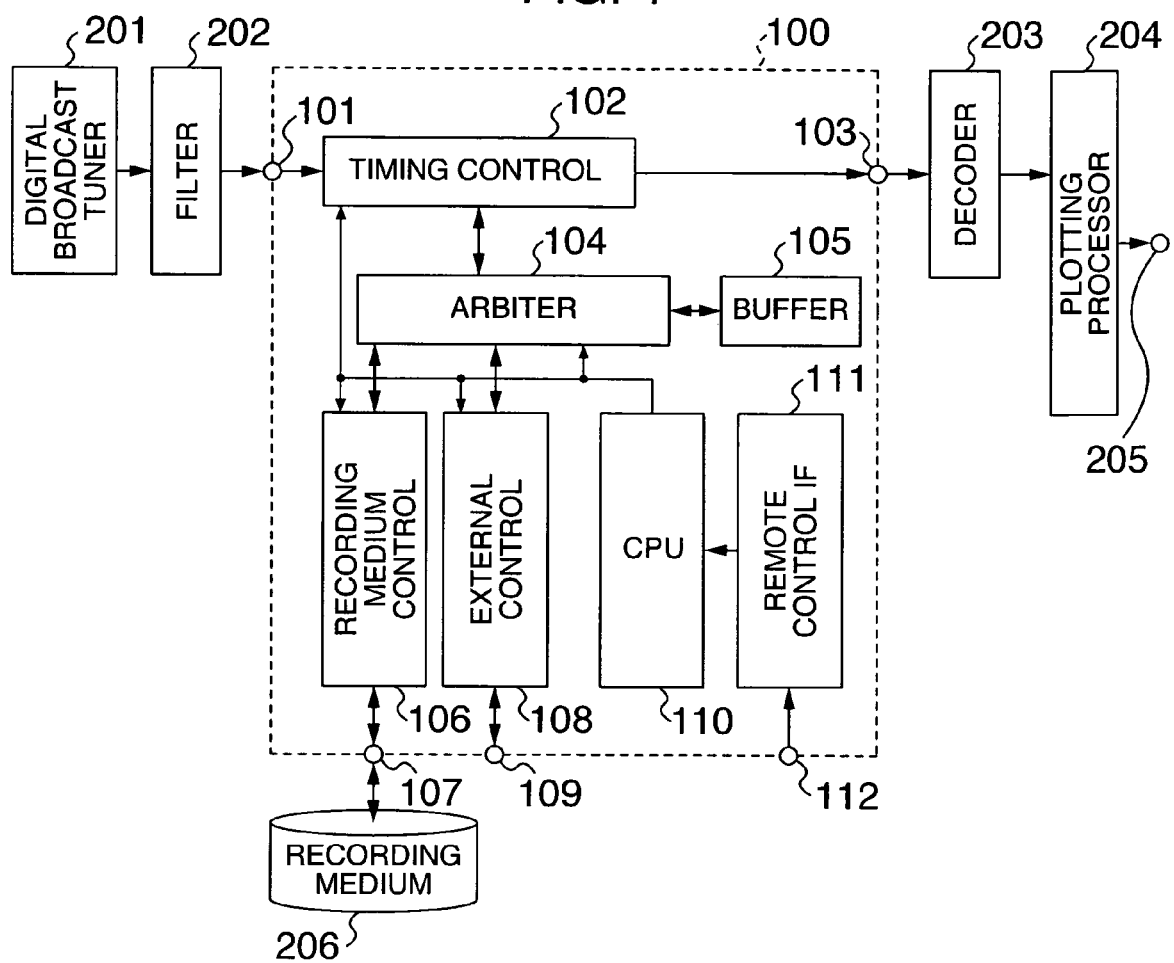
FIG. 1 is a diagram showing a block configuration of a recording and reproducing apparatus according to a first embodiment of the invention.

FIG. 1 is a block diagram for explaining a first embodiment of the invention. The digital broadcast signal received is recorded in a HDD or the like, which is connected to a plasma display or a liquid crystal display to reproduce the video signal and view a displayed image. The difference of this configuration from the conventional apparatus shown in FIG. 14 lies in that according to this embodiment, both the MPEG2-PS signal and the MPEG2-TS signal can be handled as a stream to be recorded. Also, the configuration of this embodiment has the feature in an external control unit 108. The external control unit 108 is explained in detail later.

Figure 15:
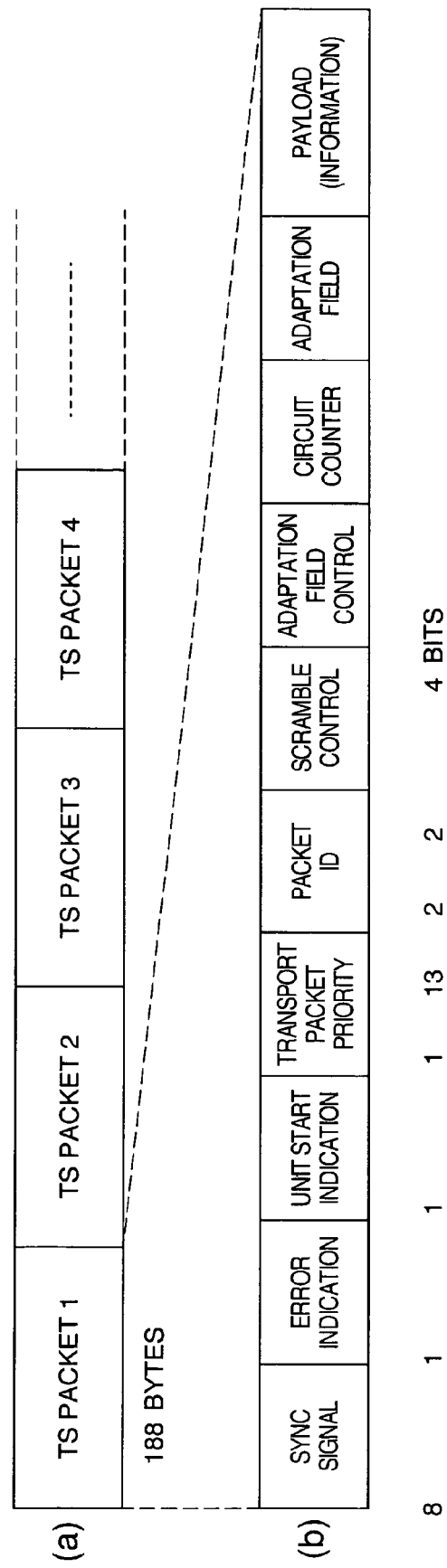
FIG. 15 is a diagram showing a configuration of the MPEG2-TS format.

FIG. 15 is a diagram showing the structure of the MPEG2-TS signal handled in the digital broadcast. The MPEG2-TS signal is configured of TS packets each having a fixed length of 188 bytes. Each TS packet includes a synchronous code (8 bits), an error indication (1 bit), a unit start indication (1 bit), a transport packet priority (1 bit), a PID (13 bits), a scramble control (2 bits), an adaptation field control (2 bits), a circuit counter (4 bits), an adaptation field and a payload. For each stream, a packet ID is set. The TS packets with the image data and audio data stored in the payload are temporally multiplexed. In the digital broadcast such as the CS broadcast, a plurality of information streams are multiplexed on MPEG2-TS as TS packets each having a packet ID. The digital broadcast tuner 201 selects one transponder frequency to be viewed or recorded, demodulates the bit stream in the selected one transponder, and after error correction, outputs by conversion into MPEG2-TS. A filter unit 202 separates the audio and video PES packets of one program from the MPEG2-TS signal input from the digital broadcast tuner 201, and supplies it to the input terminal 101 of the recording and reproducing unit 100. The recording and reproducing unit 100 of the digital broadcast system is, for example, an LSI (large scale integrated circuit) to record and reproduce the received MPEG2-TS signal in a recording medium. Numeral 101 designates a digital signal input terminal, and numeral 102 a timing control unit for attaching a 4-byte time stamp to the input digital signal, and at the time of reproduction, controlling the timing in such a manner that an access unit is output in the case where the PTS (presentation time stamp) providing the time management information coincides with the STC (system time clock) in a reference decoder of the MPEG system. Numeral 103 designates an output terminal for outputting a digital signal reproduced or input, numeral 104 an arbiter, and numeral 105 a buffer. The digital signal from each client is stored by time division in the buffer 105 through the arbiter 104. Numeral 106 designates a recording medium control unit for recording and reproducing the digital signal into and from a recording medium, and numeral 107 a connector such as ATA or ATAPI converted by the recording medium control unit 106 to connect a recording medium such as a hard disk. Numeral 108 designates an external control unit for external operation using an interface such as ATA or ATAPI format through the connector 109. Numeral 110 designates a control circuit such as a microprocessor to control the arbiter, the timing and the recording and reproducing process. Numeral 112 designates a photodetector to control the contents of the recording and reproducing unit 100 by remote control. Numeral 111 designates a remote control I/F for converting the infrared light signal from the photodetector 112 to a digital signal. The output terminal 103 of the recording and reproducing unit 100 is connected with a decoder 203 to decode the audio and video PES packets. A plotting processor 204 plots the video signal from the decoder 203 on a single screen or multiple screens and outputs a video signal to a display from the output terminal 205. This output terminal 205 is connected to, for example, a plasma display or a liquid crystal display.

The difference between the external control unit 108 and the recording medium control unit 106 lies in that the recording medium control unit 106 is a master and controls the recording medium connected to the connector 107 as a device, while the connector 109 is connected not to a recording medium but a control unit corresponding to the recording medium control unit 106. In other words, the whole recording and reproducing unit 100 is regarded as a device and controlled by the external control unit 108 as a master connected to the connector 109.

Figure 2:
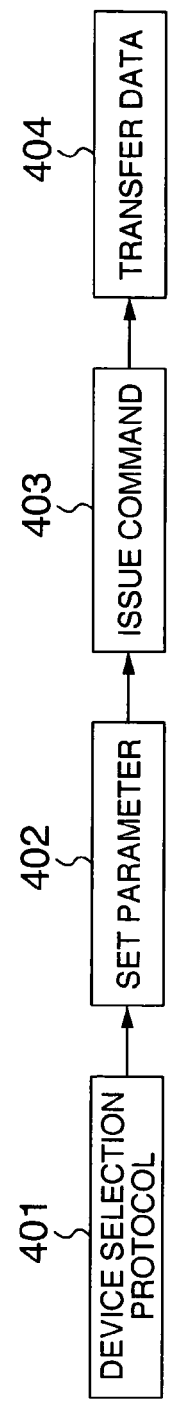
FIG. 2 is a diagram showing a command protocol of an ATA interface.

FIG. 2 is a diagram showing an example of the control signal input from the connector 109, or especially, an example of the command protocol of the ATA interface used for controlling the HDD. In the ATA command protocol, first, the process of the device selection protocol 401 is executed, followed by confirming that the external control unit 108 is idle. In the case where the external control unit 108 is idle, a command parameter is set at step 402, and at the time point when the parameter is set, a command is issued at step 403, and the data begins to be transferred to the external control unit 108 at step 404.

FIG. 3 is a diagram showing a specific example of the process of setting a parameter (step 402) and issuing a command (step 404). The parameter and the command correspond to a 2-bit chip select signal and a 3-bit address signal combined and decoded. Assume that the parameter is configured of 5 bits including the chip select signal as the most significant bits and the address signal as the least signification bits. Then, six parameters are available, including "10001" as "features", "10010" as "sector count", "10011" as "sector number", "10100" as "cylinder low", "10101" as "cylinder high" and "10110" as "device/head". For each parameter, the data 420 to 427 of 8 bits each have the meaning. Specifically, "OVL" constituting data 1 of "features" is a bit indicating whether an overlap is permitted or not, and "na" of data 7 to 2 indicates a bit of which no meaning is set. The bits "10111" correspond to "command", and the control operation of HDD is determined by decoding the 8-bit data. As an example, "A0h" in FIG. 3 indicates a packet command, i.e. "30h" a write sector command, and "20h" a read sector command. The "command" is assigned the contents of control for none of the combinations of 8 bits and secured as a reserve.

Figure 4:
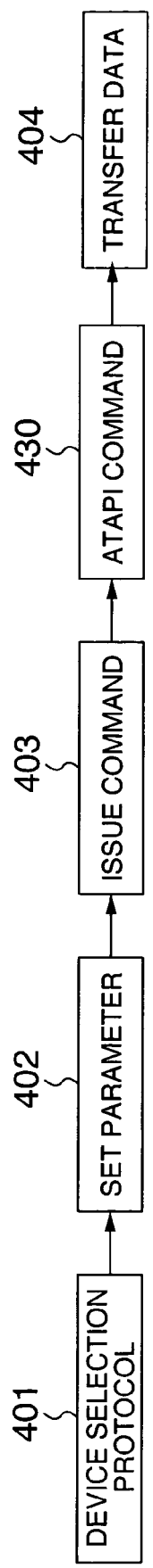
FIG. 4 is a diagram showing a command protocol of an ATAPI.

FIG. 4 is a diagram showing another example of the control signal input from the connector 109 or especially, an example of the command protocol of ATAPI used for controlling the DVD-RAM or the like. The difference from ATA in FIG. 2 is that the ATAPI command 430 is issued only in the case where the command issued at step 403 is a packet command. After that, the data is transferred at step 404.

FIG. 5 is a diagram showing the ATAPI command 430 in detail. The command packet includes, in most cases, an instruction code 520 of one byte and parameters 501 to 512 of 11 bytes. As understood from FIGS. 2 and 4, the ATAPI command is an expansion of the ATA command. With regard to the undefined portion of the packet command according to this embodiment, a unique command can be issued to the CPU 110. Specifically, the recording medium connected to the connector 107 includes a recording mode to record the contents from the connector 109, a reproduction mode to reproduce the contents recorded in the recording medium from the connector 109, a copy mode simply to copy the contents (without deleting the contents of the recording medium), and a move mode to move the contents (by deleting the contents of the recording medium). The external control unit 108 notifies the CPU 110 that the parameter is set at step 402, the command is issued at step 403 and the ATAPI command 430 is received. In the case where the command received is in copy, reproduction or move mode, the path following the route including the recording medium control unit 106, the arbiter 104, the buffer 105, the arbiter 104, the external control unit 108 in that order is activated. In recording mode, on the other hand, the path following the route including the external control unit 108, the arbiter 104, the buffer 105, the arbiter 104 and the recording medium control unit 106 in that order is activated. Thus, two types of digital signals input from the connector 101 and the connector 109 are recorded in and reproduced from the recording medium.

This configuration makes it possible for the external control unit 108 to coordinate the control operation for recording the data in the recording medium 206 based on the control signal input from the connector 109. As a result, the configuration of the existing recording and reproducing apparatus of the digital broadcast system can be utilized, thereby reducing the labor and cost of the system change.

Even in the case where the connector 109 is connected with nothing and open, the recording and reproducing unit 100 is not adversely affected and can be used as an independent recorder for digital broadcast.

The recording and reproducing unit 100, which includes the control unit 110, the remote control IF 111 and the photodetector 112, may alternatively have an independent configuration. Also, the data transferred may be a packetized operating instruction to the CPU 110, instead of a stream recorded in the recording medium.

Further, although the recording and reproducing unit 100 explained above as one chip LSI, the component parts including the CPU 110 and the buffer 105 may be configured as an independent chip with equal effects.

Figure 6:
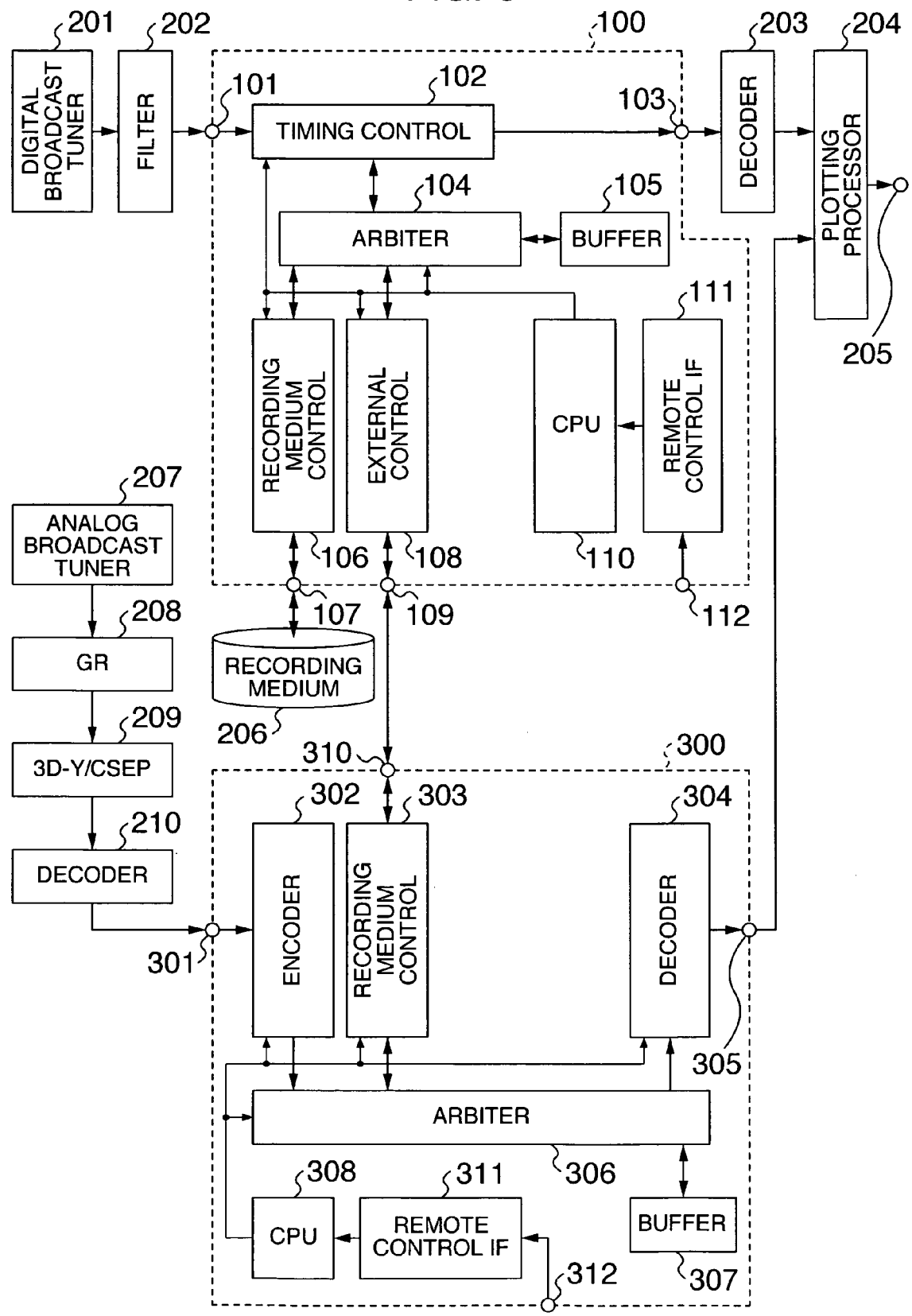
FIG. 6 is a diagram showing a block configuration of a recording and reproducing apparatus according to a second embodiment of the invention.

FIG. 6 is a block diagram for explaining a second embodiment of the invention. This embodiment employs a system in which the analog broadcast signal is encoded as MPEG2-PS from the connector 109 of the recording and reproducing apparatus shown in FIG. 6, and recorded in the recording medium 206. According to this embodiment, the recording and reproducing unit 300 having only one recording medium control unit 303 is combined with the recording and reproducing unit 100 to make up a combo recorder capable of recording and reproducing both analog and digital broadcast signals.

The commands from the CPU 308 and the MPEG2-PS signals encoded from the analog broadcast signal are transferred from the recording medium control unit 303 to the connector 310 and then to the connector 109 in ATA or ATAPI format. Thus, the commands are recorded in the CPU 110, and the MPEG2-PS signals are recorded in the recording medium 206. At the time of reproduction from the recording medium 206, a reproduction command is issued from the CPU 309 to the external control unit, and transferred by the CPU 110 to the recording and reproducing unit 300 through the recording medium control unit 106 and the external control unit 108.

The decoder 203 is used for the MPEG2-TS signal. Therefore, the decoder 304 for the MPEG2-PS signal is arranged in the recording and reproducing unit 300 to perform the decode operation.

The outputs of the decoder 203 and the decoder 304 are scaled by the plotting processor 204, after which one or both of them are displayed.

This configuration makes it possible to record or reproduce digital signals of different formats in or from the same recording medium.

The recording and reproducing unit 100, though configured to include the control unit 309, the remote control IF 111 and the photodetector 112, may alternatively be configured as an independent unit.

Also, the digital signal processing unit 300, though configured to include the control unit 309, the remote control IF 311 and the photodetector 312, may alternatively be an independent unit.

Although the decoder 203 and the plotting processor 204 are not included in the recording and reproducing unit 100, both or one of them can be built in the recording and reproducing unit 100. Also, in spite of the foregoing explanation of the recording and reproducing unit 100, 300 as a one-chip LSI, the CPU, the buffer, the encoder, the decoder and other component parts may also be configured as an independent chip with equal effects.

Figure 7:
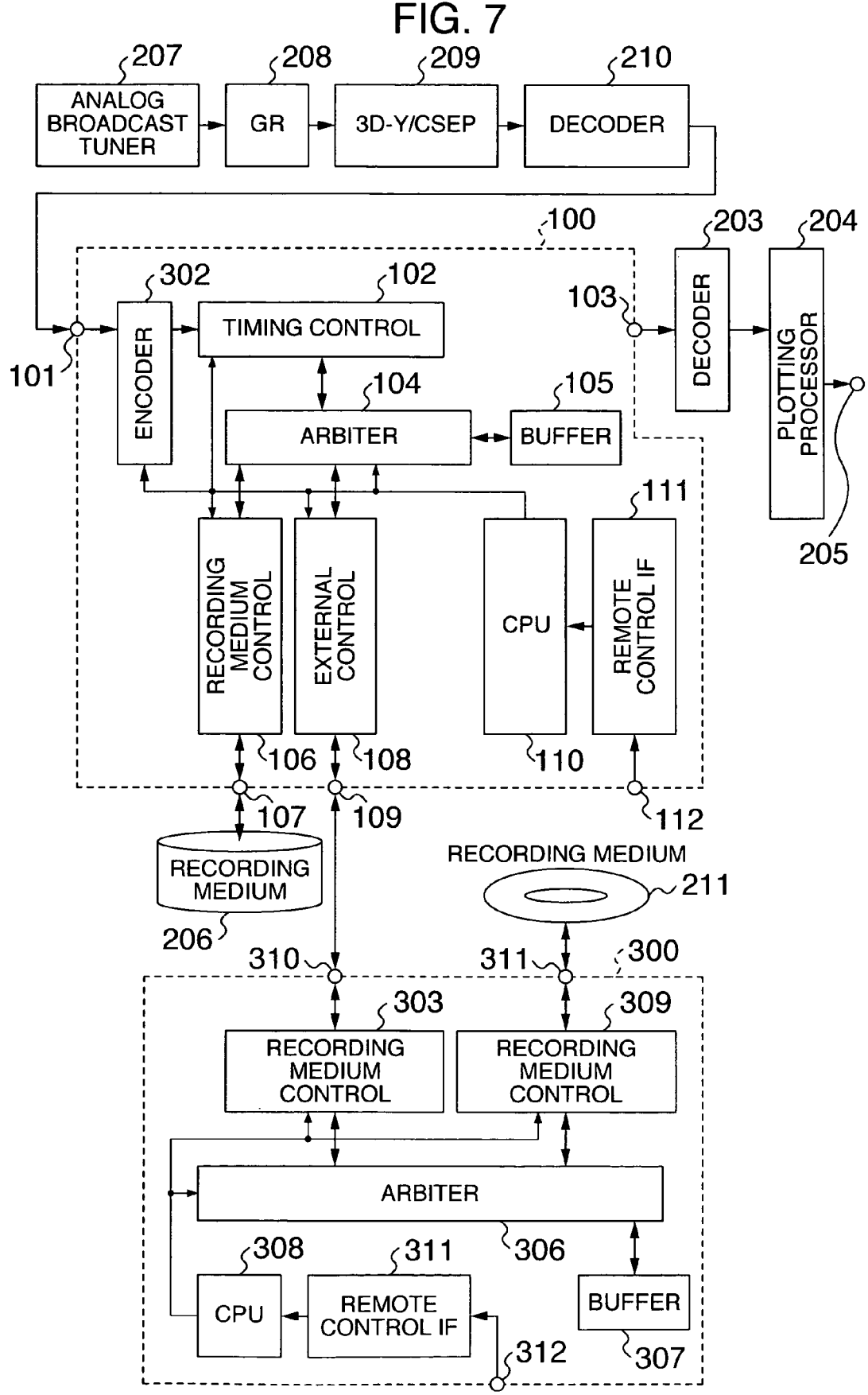
FIG. 7 is a diagram showing a block configuration of a recording and reproducing apparatus according to a third embodiment of the invention.

FIG. 7 is a block for explaining a third embodiment of the invention. This embodiment concerns a case in which only an analog broadcast signal is input. The difference of this embodiment lies in that the encoder 302 is arranged in the recording and reproducing unit 100, the analog broadcast signal is encoded into MPEG2-PS format and recorded in the recording medium 206. In this embodiment, all the streams assume the MPEG2-PS format. The decoder 203, therefore, is an MPEG2-PS decoder, and the recording and reproducing unit 300 mainly controls the operation of recording and reproducing the signals into and from the recording medium 211. This method can construct a system even with the combo recorder exclusive to the analog broadcast.

The recording and reproducing unit 100, though configured to include the control unit 110, the remote control IF 111 and the photodetector 112, may alternatively be configured as an independent unit. Similarly, the digital signal processing unit 300, though configured to include the control unit 309, the remote control IF 311 and the photodetector 312, may alternatively be configured as an independent unit.

Although the decoder 203 and the plotting processor 204 are not included in the recording and reproducing unit 100, both or one of them may be built in the recording and reproducing unit 100. Also, in spite of the foregoing explanation of the recording and reproducing unit 100, 300 as a one-chip LSI, other component elements such as the CPU, the buffer, the encoder and the decoder may also be configured as an independent chip with equal effect.

Figure 8:
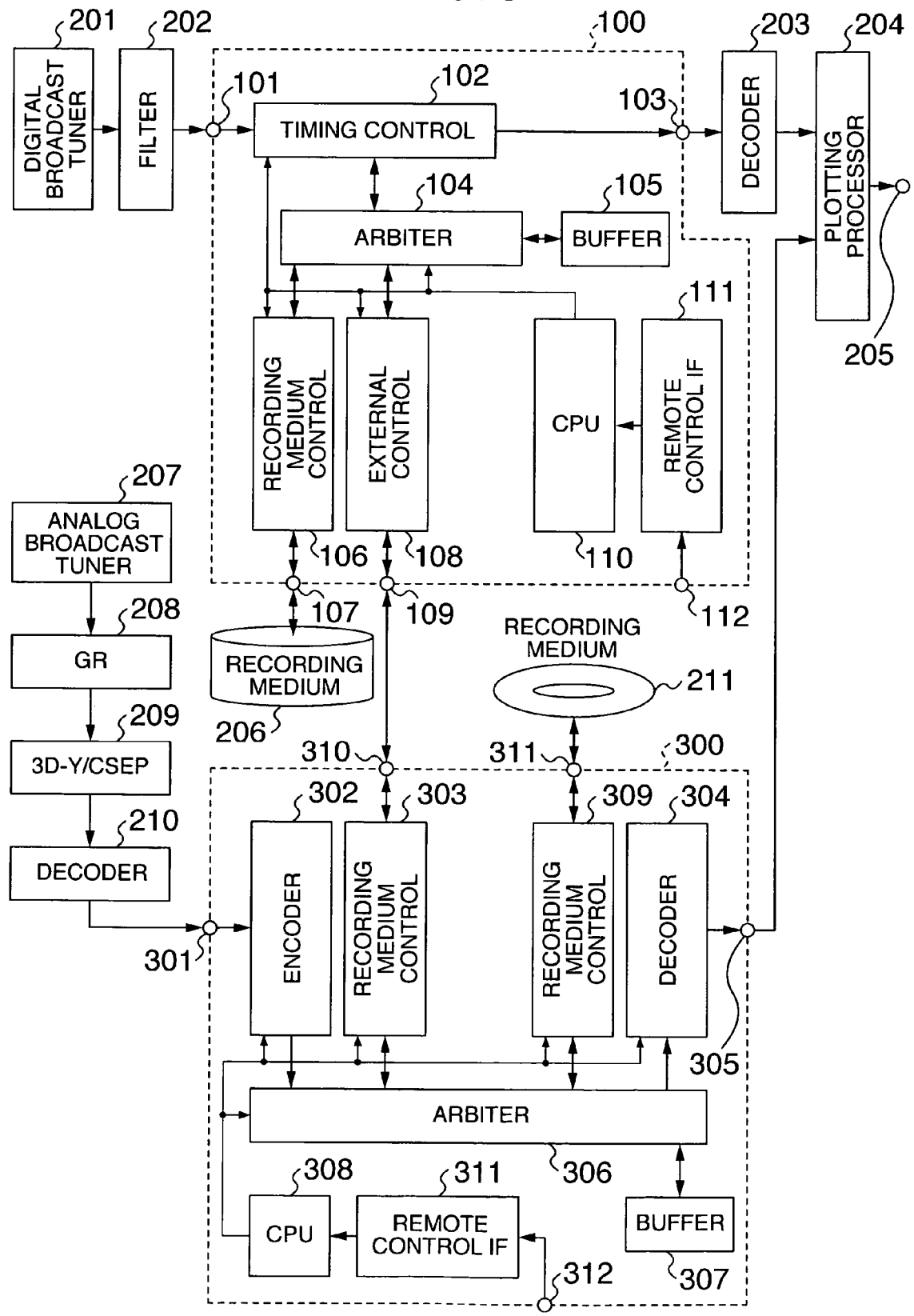
FIG. 8 is a diagram showing a block configuration of a recording and reproducing apparatus according to a fourth embodiment of the invention.

FIG. 8 is a block diagram for explaining a fourth embodiment. This embodiment is so configured that a HDD providing a recording medium of stationary type is arranged in the recording and reproducing unit 100, and a DVD-RAM constituting a removable recording medium is arranged in the recording and reproducing unit 300. The recording and reproducing unit 300 includes two recording medium control units 303, 309 and can itself constitute a recording and reproducing apparatus which can constitute a combo recorder of the analog broadcast system. The recording medium control unit 309, like in the prior art, is connected to the DVD-RAM, while the recording medium control unit 303 is connected with the recording and reproducing unit 100 to control the data transfer to the recording medium 206. The encoder 302 encodes the analog broadcast signal to MPEG2-PS format and therefore the signal can be directly recorded in the DVD-RAM 211. The MPEG2-PS signal can be recorded in or reproduced from the HDD 206 connected to the recording and reproducing unit 100, through the same process as in the third embodiment. Also, the contents of the HDD 206 can be copied or moved to the DVD-RAM 211 through the arbiter 306.

With the configuration described above, the external control unit 108 controls the operation of recording the analog broadcast signal input through the connector, in the recording medium 206 based on the control signal input from the connector 109. As a result, the configuration of the existing recording and reproducing apparatus of the digital broadcast system can be utilized, thereby reducing the labor and cost of system change.

In spite of the configuration of the recording and reproducing unit 100 including the control unit 110, the remote control IF 111 and the photodetector 112, the recording and reproducing unit 100 may be configured as an independent unit.

Also, the digital signal processing unit 300, though configured to include the control unit 309, the remote control IF 311 and the photodetector 312, may alternatively be configured as an independent unit.

Although the decoder 203 and the plotting processor 204 are not included in the recording and reproducing unit 100, both or one of them can be built in the recording and reproducing unit 100. Also, in spite of the foregoing explanation of the recording and reproducing unit 100, 300 as a one-chip LSI, other components such as the CPU, the buffer, the encoder and the decoder may also be configured as an independent chip with equal effects.

Figure 9:
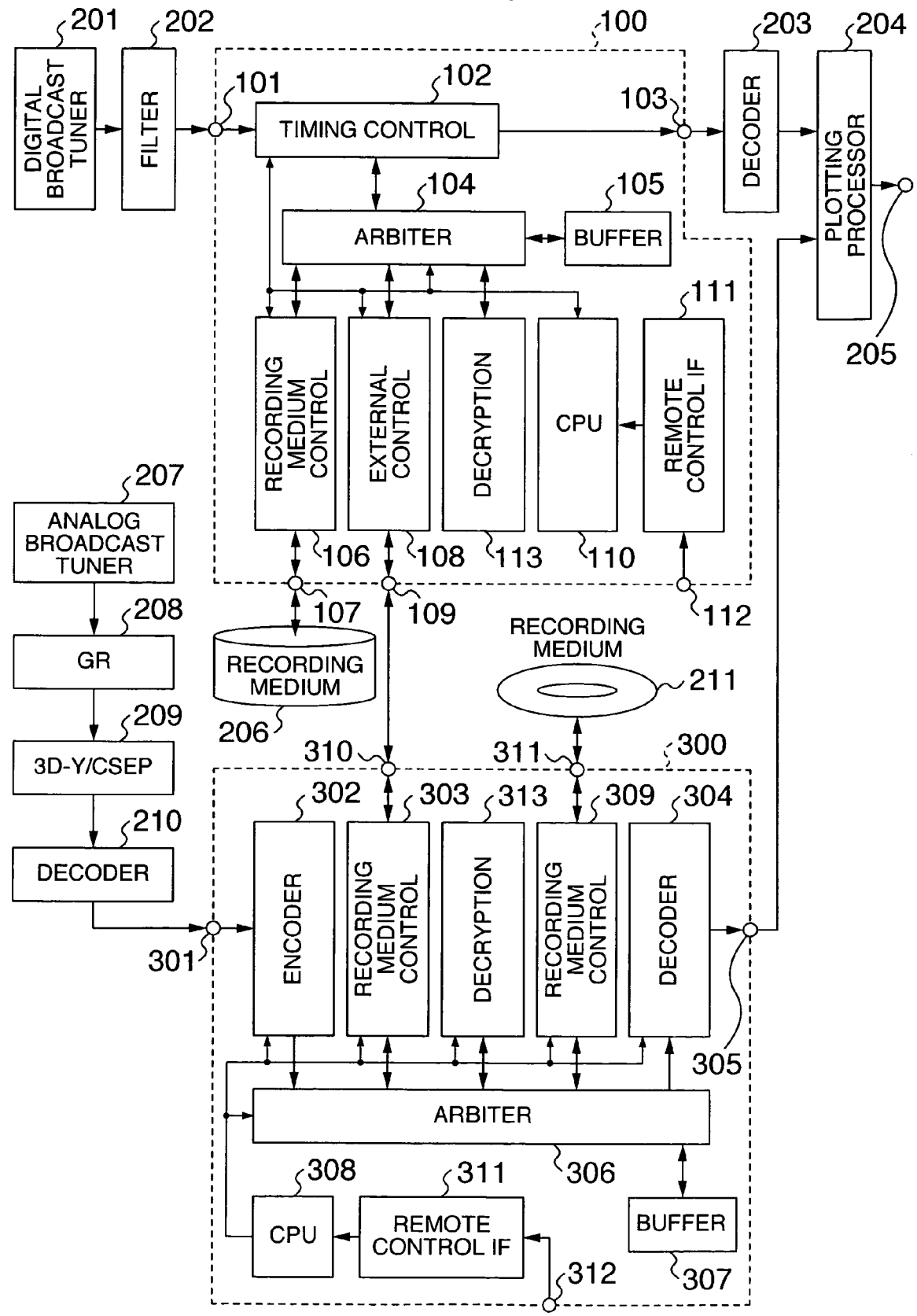
FIG. 9 is a diagram showing a block configuration of a recording and reproducing apparatus according to a fifth embodiment of the invention.

FIG. 9 is a block diagram for explaining a fifth embodiment of the invention. According to this embodiment, the contents recorded in the recording medium 206 and the recording medium 211 are encrypted to protect the copyright. A encryption/decryption unit 113 encrypts the contents recorded in the recording medium 206, while the encryption/decryption unit 313 encrypts the contents recorded in the recording medium 211. In encrypting the digital broadcast signal, the data with a time stamp attached thereto by a timing control unit 102 and passed through a buffer 105 are encrypted by the encryption/decryption unit 113 and applied through the buffer 105 again. Next, the data encrypted and applied through the buffer 105 are supplied to the recording medium control unit 106 and recorded in the recording medium 206. At the time of reproduction, the data is decrypted in the opposite process to the recording, i.e. through the recording medium 206, the encryption/decryption unit 113, the timing control unit 102 and the output terminal 103. Although the path for the arbitration of the buffered signal is not explained, the arbitration is conducted by the arbiter 104 in each path.

The analog broadcast signal is encrypted and recorded in the recording medium 206 through such a path that the contents encoded by the encoder 302 in MPEG2-PS format are applied through the recording medium control unit 303, the external control unit 108, the encryption/decryption control unit 113, the recording medium control unit 106 and the recording medium 206. At the time of reproduction, the path opposite to that of recording is followed. In the case where the contents of MPEG2-PS format encrypted and recorded in the recording medium 206 are copied or moved to the recording medium 211, on the other hand, the recording operation is conducted through a path including the recording medium 206, the recording medium control unit 106, the encryption/decryption control unit 113, the external control unit 109, the recording medium control unit 310, the encryption/decryption control unit 313, the recording medium control unit 311 and the recording medium 211. The encryption/decryption unit 113 operates in decryption mode, and the encryption/decryption unit 313 in encryption mode. Also in this case, the arbiters 104 and 306 conduct the arbitration not to disrupt the buffering process. This configuration protects the copyright of the contents recorded in the recording media 206, 211.

Also, the encryption/decryption unit 113 and the encryption/decryption unit 313 may use the same encryption algorithm, so that the data and commands transferred to and from the external control unit 109 and the recording medium control unit 303 may be encrypted appropriately. Although the recording and reproducing units 100, 300 are described above as a one-chip LSI, different chips may constitute the CPU, the buffer, the encoder, the decoder and other component parts with equal effects.

Figure 10:
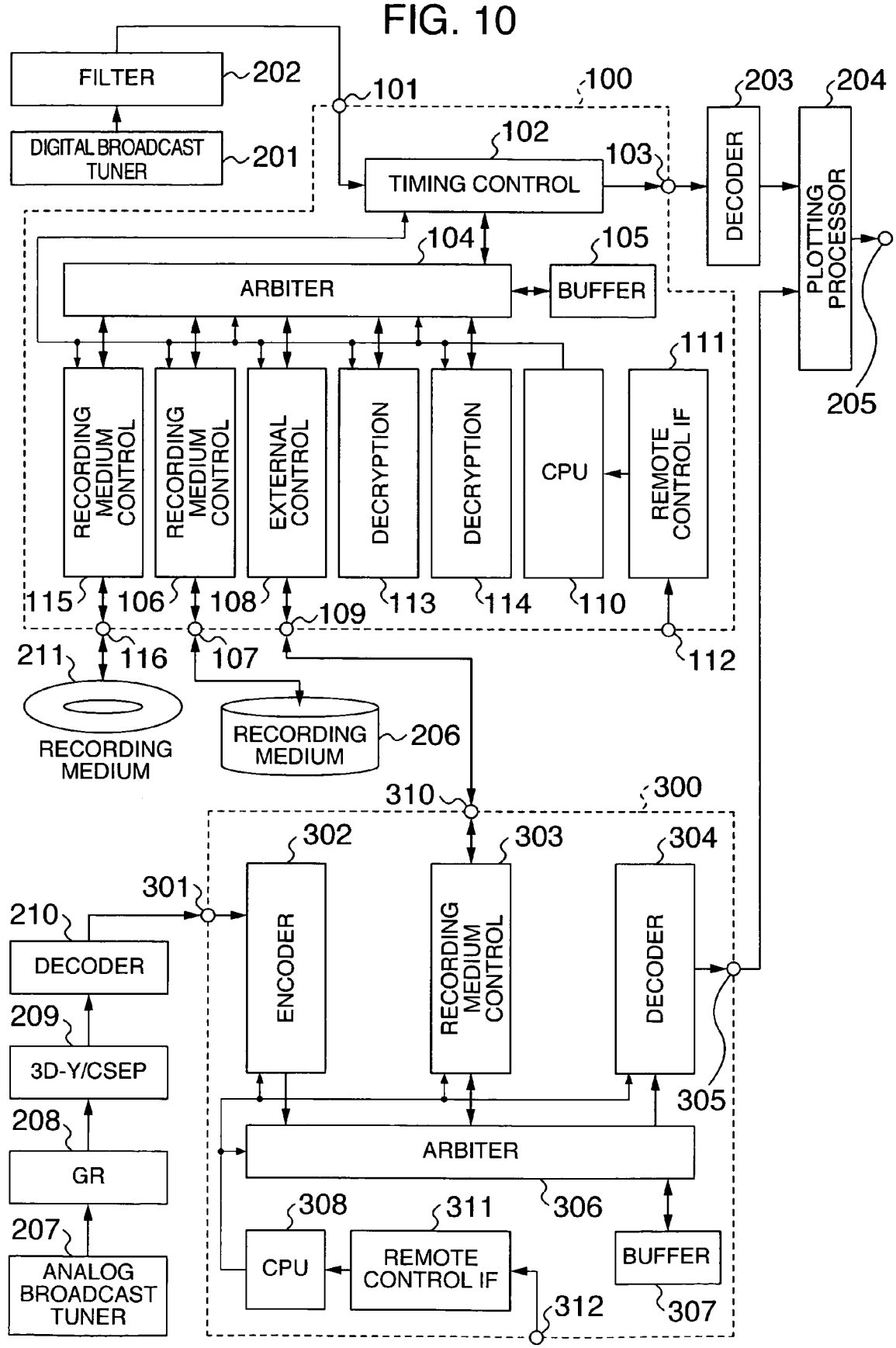
FIG. 10 is a diagram showing a block configuration of a recording and reproducing apparatus according to a sixth embodiment of the invention.

FIG. 10 is a block diagram for explaining a sixth embodiment of the invention. According to this embodiment, the recording medium 206 and the recording medium 211 are connected to the recording and reproducing unit 100, and the recording and reproducing unit 300 is used to encode and decode the analog broadcast signal. The encryption/decryption unit 114 for the recording medium 211 is connected to the recording and reproducing unit 100, and the MPEG2-PS format is introduced through the external control unit 108. In this configuration, the contents can be copied or moved between the recording medium 206 and the recording medium 211 independently of the external control unit 108. Thus, the process can be executed at high speed.

Although the foregoing explanation refers to a case in which the recording and reproducing units 100, 300 are configured as a one-chip LSI, other component elements such as the CPU, the buffer, the encoder and the decoder may also be configured as independent chips with equal effect.

Figure 11:
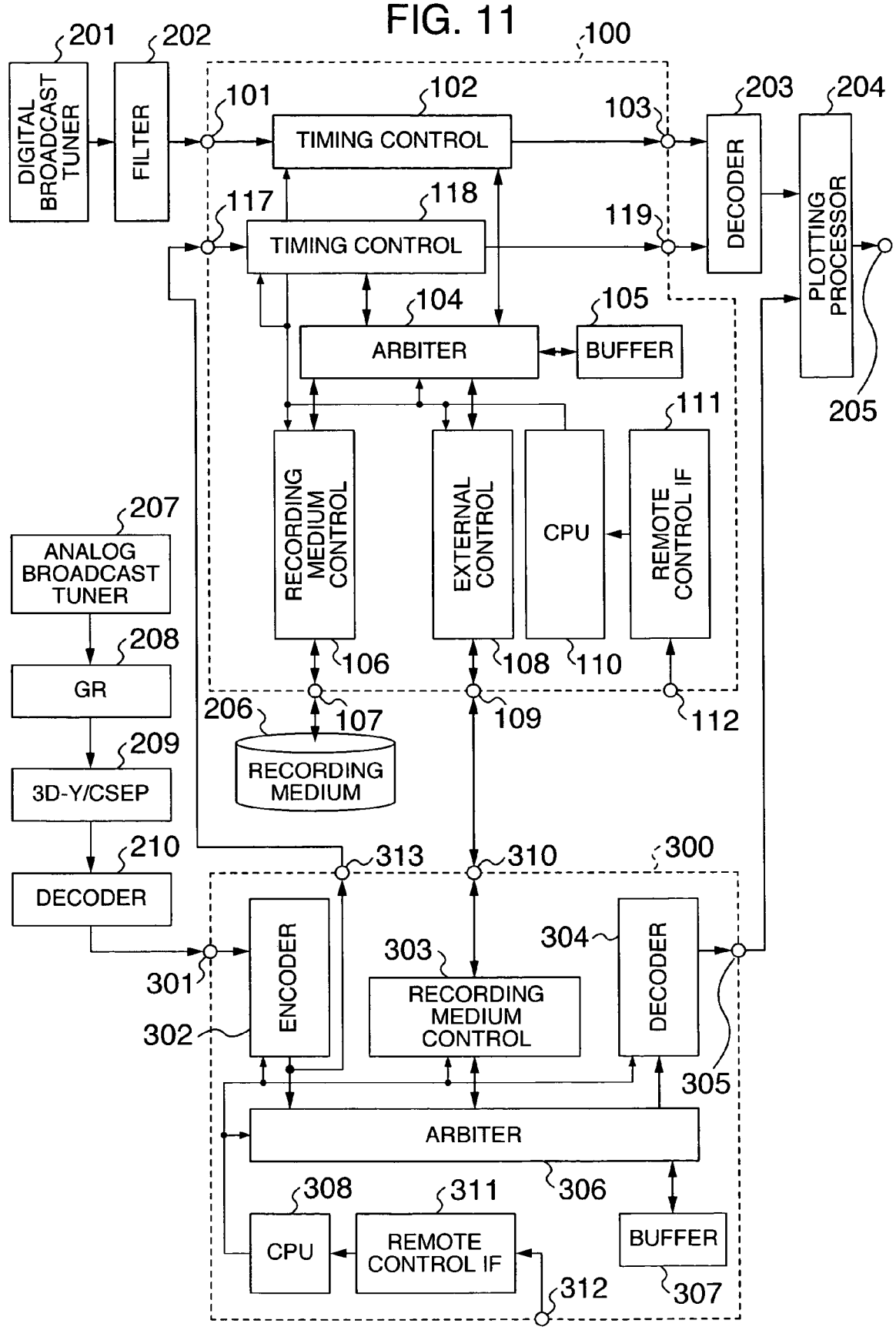
FIG. 11 is a diagram showing a block configuration of a recording and reproducing apparatus according to a seventh embodiment of the invention.

FIG. 11 is a block diagram for explaining a seventh embodiment of the invention. According to this embodiment, the CPU 308 has the function of enabling the encoder 302 to encode the analog broadcast signal in any one of MPEG2-PS and MPEG2-TS formats.

This embodiment is different from the second embodiment in that the signal is recorded in the recording medium 206 through different paths according to whether it is encoded in MPEG2-TS format or MPEG2-PS format. In the case where the CPU 308 causes the encoder 302 to encode the signal in MPEG2-PS format, the data is recorded in the recording medium 206 through the same path as in the second embodiment. At the time of reproduction, however, the decoder 203 for MPEG2-TS cannot be used for reproduction in MPEG2-PS format, and therefore the recording medium control unit 303 reads the MPEG2-PS data from the recording medium 206 through a path including the recording medium control unit 107, the arbiter 104, the buffer 105, the arbiter 104 and the external control unit 108 in that order, and decoded by the decoder 304. The signal thus decoded is output selectively as the digital broadcast system in the plotting processor 204. In this way, the analog broadcast signal and the digital broadcast signal can be recorded in and reproduced from the recording medium 206.

Next, in the case where the CPU 308 causes the encoder 302 to encode the data in MPEG2-TS format, the MPEG2-TS signal is transmitted to the input terminal 117 of the recording and reproducing unit 100 from the output terminal 313. The timing control unit 118A attaches a time stamp to the MPEG2-TS signal thus input, and the resulting signal is recorded in the recording medium 206. At the time of reproduction, the data is decoded by the decoder 203.

This configuration makes possible the recording and reproducing operation regardless of whether the encoder for compressing and encoding the analog broadcast signal is of MPEG2-TS or MPEG2-PS type.

Also, instead of forming the recording and reproducing unit 100, 300 of one-chip LSI as described above, the CPU, the components such as the buffer, the encoder and the decoder may be configured as an independent chip with equal effects.

Figure 12:
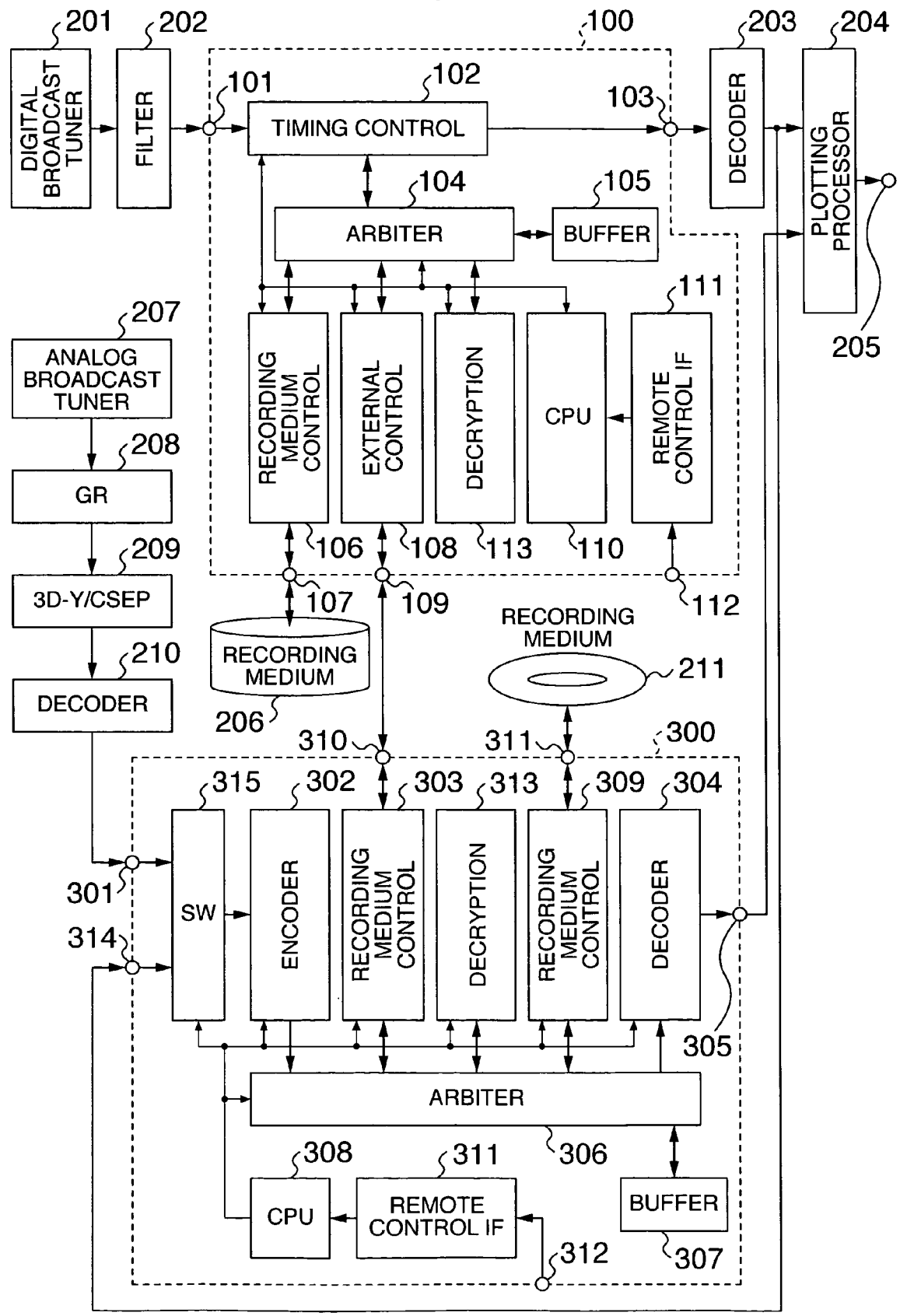
FIG. 12 is a diagram showing a block configuration of a recording and reproducing apparatus according to an eighth embodiment of the invention.

FIG. 12 is a block diagram for explaining an eighth embodiment of the invention. According to this embodiment, the output of the decoder 203 is connected to the input terminal 314 of the recording and reproducing unit 300, and the signal from the decoder 210 of the analog broadcast system is switched by a switching unit 315. As a result, the contents of the digital broadcast can be recorded again in the recording medium in MPEG2-TS format by being encoded at a compression ratio different from the first recording session. According to this embodiment, the encoder 302 uses the switching unit 315 for both inputs. As an alternative, the encoder 302 may be used exclusively for the input terminal 314, and a second encoder is included while eliminating the switching unit with equal effects.

Figure 13:
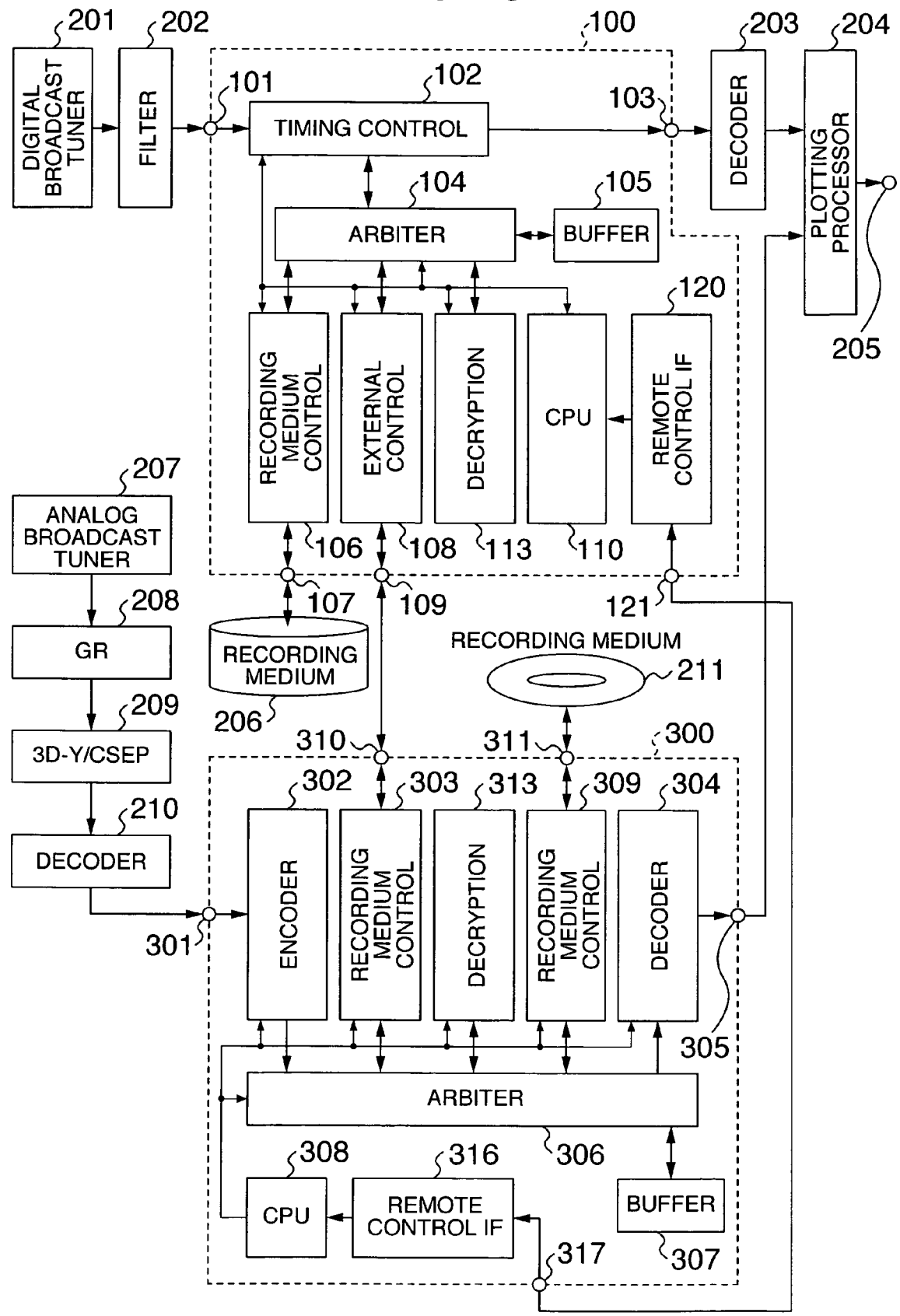
FIG. 13 is a diagram showing a block configuration of a recording and reproducing apparatus according to a ninth embodiment of the invention.

FIG. 13 is a block diagram for explaining a seventh embodiment of the invention. According to this embodiment, a CPU 110 to control the recording and reproducing unit 100 and a CPU 308 to control the recording and reproducing unit 300 are configured to control the recording and reproducing operation for the recording media 206, 211 by transmitting and receiving a control command through serial communication interfaces 120, 308, for example.

A command to determine the operating conditions and the operation command requiring a comparatively high response is transmitted through a serial communication interface, while the information such as a status requiring no high operating speed are acquired by an interface using the external control unit 109 and the recording medium control unit 303. In this way, the communication with the CPUs 110, 308 can be carried out efficiently.

The embodiment described is above is so configured that the external control unit 108 included in the recording and reproducing unit 100 of the digital broadcast system coordinates the control operation to record the data in the recording medium 206 based on the control signal input from the connector 109. As an alternative, a similar configuration to the external control unit may be included in the recording and reproducing unit 300 of the analog broadcast system. By doing so, the configuration of the recording and reproducing apparatus of the existing analog broadcast system can be utilized, thereby reducing the labor and cost of the system change.

The embodiments described above in which a unit configuration of a digital broadcast system or an analog broadcast system is assumed. This invention, however, is not limited to such a configuration.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing apparatus, comprising:
    an analog broadcast unit to receive and reproduce an analog broadcast signal; and
    a digital broadcast unit to receive and reproduce a digital broadcast signal;
    wherein said digital broadcast unit includes:
    a digital recording unit to record the digital broadcast signal received,
    an input unit to input selected one of a control signal generated in said analog broadcast unit for controlling the recording operation into said digital recording unit and an analog broadcast signal received by said analog broadcast unit, and
    a control unit to control the recording operation into said digital recording unit; wherein:
    said control unit performs the control operation in such a manner that said analog broadcast signal input through said input unit is recorded in said digital recording unit based on the control signal input from said input unit, and
    said analog broadcast unit includes an encoder to compress said digital broadcast signal reproduced by said digital broadcast unit, in a format different from said digital broadcast signal.

2. A recording and reproducing apparatus, comprising:
    an analog broadcast unit to receive and reproduce an analog broadcast signal;
    a digital broadcast unit to receive and reproduce a digital broadcast signal; and
    a connector to connect said analog broadcast unit and said digital broadcast unit to each other to exchange data, wherein:

said analog broadcast unit includes a first recording unit to record the received analog broadcast signal, said digital broadcast unit includes a second recording unit to record the received digital broadcast signal and a control unit to control the recording operation of said digital recording unit based on the control signal generated by said analog broadcast unit and input through said connector, said control unit performs the control operation in such a manner that said analog broadcast signal input through said connector is recorded in said first recording unit, while said analog broadcast signal input through said connector is recorded in said second recording unit based on the control signal input through said connector, and said first recording unit is a HDD and said second recording unit is a selected one of a DVD-RAM and a DVD-ROM.

* * * * *